(12) United States Patent
Flint et al.

(10) Patent No.: US 6,289,213 B1
(45) Date of Patent: Sep. 11, 2001

(54) COMPUTERS INTEGRATED WITH A CORDLESS TELEPHONE

(75) Inventors: Ephraim Bemis Flint, Garrison; Paul Francis Greier, Carmel; Lawrence Shungwei Mok, Brewster; William Edward Pence, New York, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/601,390

(22) Filed: Feb. 14, 1996

(51) Int. Cl.$^7$ ...................................................... H04Q 7/32
(52) U.S. Cl. .......................... 455/420; 455/556; 455/557
(58) Field of Search ....................... 455/556, 420, 455/557, 561, 563, 3.1, 4.1, 5.1, 6.3, 550, 462, 403, 66; 370/392; 348/552; 379/142, 93.25, 93.05

(56) References Cited

U.S. PATENT DOCUMENTS

| 4,016,542 | 4/1977 | Azure . |
| 4,456,793 | 6/1984 | Baker et al. . |
| 4,661,659 | * 4/1987 | Nishimura ............................ 455/462 |
| 4,700,378 | * 10/1987 | Brown ................................ 379/93.25 |
| 4,850,009 | 7/1989 | Zook et al. . |
| 4,916,441 | 4/1990 | Gombrich . |
| 4,969,180 | 11/1990 | Watterson et al. . |
| 5,153,903 | 10/1992 | Eastmond et al. . |
| 5,157,687 | 10/1992 | Tymes . |
| 5,249,220 | 9/1993 | Moskowitz et al. . |
| 5,349,638 | * 9/1994 | Pitroda et al. ........................ 379/142 |
| 5,533,097 | * 7/1996 | Crane et al. ........................... 455/556 |
| 5,636,211 | * 6/1997 | Newlin et al. ........................ 370/465 |
| 5,655,214 | * 8/1997 | Mullett ................................. 455/5.1 |
| 5,671,267 | * 9/1997 | August et al. ....................... 455/420 |
| 5,771,453 | * 6/1998 | Haartsen .............................. 455/449 |
| 5,802,467 | * 9/1998 | Salazar et al. ....................... 455/420 |
| 5,831,664 | * 11/1998 | Wharton et al. ........................ 348/13 |
| 5,949,775 | * 9/1999 | Rautiola et al. ..................... 370/401 |

FOREIGN PATENT DOCUMENTS

| 363187847 | * 8/1988 | (JP) ..................................... 379/103 |
| WO 90/16033 | 12/1990 | (WO) . |

* cited by examiner

Primary Examiner—Nay Maung
Assistant Examiner—Jean A. Gelin
(74) Attorney, Agent, or Firm—Thomas A. Beck; Daniel P. Morris, Esq.

(57) ABSTRACT

The present invention is directed to a computer system that has at least two computers which are connected via cordless telephone. The handset of the cordless telephone is integrated with a portable computer and the base station of the cordless telephone is integrated with a regular desktop or desk-side computer. The hand-held computer includes a microprocessor, a display, storage, a keypad to enter data, a microphone to receive voice data and speak to play voice data, and an antenna to communicate with the base station. The base station includes receiver and transmitter and an antenna, signal controller and the means for acting to a telephone system. The apparatus can be adapted for use with a television and a VCR.

11 Claims, 8 Drawing Sheets

COMPUTERS INTEGRATED WITH A CORDLESS TELEPHONE

FIELD OF THE INVENTION

The present invention is directed to a computer system that has at least two computers which are connected via a cordless telephone and applications thereof.

BACKGROUND

There are a variety of schemes for connecting personal computers. They vary from the traditional point-to-point connection using wires between two computers to wireless local-area-network for a whole array of computers. As hand-held personal computers get smaller, the connection requirements for these small units to their large counterparts become more unique. In this case, it is too cumbersome to use wires for connection and too expensive to use complete wireless local area network in which the software overhead is larger. Furthermore, local-area-networks are not yet ready to handle the time-bound voice signals which are likely to be common in those small hand-held units which are likely designed to handle voice signals. The computer system disclosed herein will provide data and voice connections between a hand-held computer and a regular personal computer while each one of them can communicate to outsiders via public telephone lines independently.

OBJECTS

An object of the present invention is to provide a device for a user to control, enter inputs, or retrieve outputs to or from a computer, for instance, the device can emulate a wireless mouse, or can be used as wireless microphone and loudspeaker. It is a general-purpose, programmable, wireless, and multimedia device.

Another object of the present invention is to provide a device which can be programmed as a cordless display telephone in which the incoming data can be shown on the device's display. It is not just a combination of telephone and computer. The telephone function is greatly enriched. For example, call screening and call automation can easily be implemented. Furthermore, with the built-in pressure-sensitive touch screen, a user can capture and display handwriting notes directly.

Another object of the present invention is to provide a device which divides the tasks of signal processing between two devices. In speech recognition and handwriting recognition, the voice signal is first processed on the hand-held unit, if there is no match on the signal, then it will pass to the base unit where the processing power is much higher.

Another object of the present invention is to to provide a device wherein the transmission of voice and data between the handset and the base units can be transmitted simultaneously. The voice and data are transmitted simultaneously by frequency-division or time-division multiplexing.

Another object of the present invention is to provide a device which is a combination of a display and a touch screen which allows part of a menu to be downloaded to the hand-held unit from the base unit. By looking at the display on the hand-held unit, a user can activate the menu by touching the screen. Since the display is much closer to the user, it is much easier to see and act on compared to the menu on the display of the base computer.

It is another object of the present invention to provide new means to implement a truly pocketable digital assistant for office and/or home applications. It includes the digital assistant consisting of minimal hardware, such as a speaker, a microphone, a keypad, a cordless link, and a base station comprising a PC or a workstation or a custom system with a cordless link.

It is another object of the present invention to provide new means to make cellular connection. It includes a cellular radio residing in or in the neighborhood of the base station that is used as a relay point between the digital assistant and the cellular network.

SUMMARY OF THE INVENTION

The present invention is directed to an apparatus having a first computer, a second computer and a base station. The base station is adapted for wireless communication to the first computer and the second computer. The base station has means for communication on a telephone line. The first computer has a first means for communication with the base station. The second computer has a second means for wireless communication with the base station.

BRIEF DESCRIPTION OF THE DRAWINGS

Further objects, features, and advantages of the present invention will become apparent from a consideration of the following detailed description of the invention when read in conjunction with the figures in which.

DESCRIPTION

A pair of devices that make up the personal computer-communication system according to the present invention consist of a hand-held unit which communicates with a base unit via any wireless means. The hand-held unit has processor, memory, display, touch-screen digitizer, modem, microphone, loudspeaker, audio processing module, telephone signal processing module, and wireless module. The base unit has similar components as in the hand-held unit and acts as a relay station to other telecommunication infrastructures, such as public switched telephone network (PSTN), cellular phone, and local area network (LAN). The base unit can be integrated into a personal computer or workstation.

Both data and voice can be communicated between the hand-held and base units simultaneously. Data include all digitally coded information, for instance, FAX and coded images. Voice can be transmitted simultaneously in analog and digital forms.

The hand-held unit can be used as a conventional cordless telephone as well as a cordless display telephone. Some examples of its usages are: (1) the caller's hand-held unit displays a menu sent along with the receiving party's greeting message. Instead of listening to a long message about how to push buttons to direct your call, you can now look at the menu and touch the item listed on the menu to have your call directed without memorizing which button to push. The touch screen is programmed according to the menu; (2) the user can write a short note on the digitizer which is then digitized, compressed, and sent to the other side when he/she is still on the phone; (3) the user can view a short text message such as name and address before sending or after receiving it.

This will save time and reduce errors compared to just exchanging it verbally through the phone alone.

If the base unit is integrated into a PC, then the PC can be programmed as a digital telephone answering machine. The PC's hard disk will be the storage. Furthermore, if a user programs his base unit to accept other hand-held units, then his visitors can leave a voice message to his base unit.

The touch-screen digitizer (pressure sensitive) on the hand-held unit can be programmed to control the cursor movement on the PC's display if the base unit is connected to a PC. It becomes a wireless mouse or trackball emulator. When the user places his/her thumb or finger on the digitizer it will locate the cursor on the PC's screen. The cursor on the PC's display will move according to the moving direction and speed of the finger on the digitizer. The finger movement on the digitizer is coded and sent to the PC where it is decoded and intersects the mouse routine to control the cursor. There are keys next to the digitizer to activate the mouse action keys. This scheme can further be incorporated into window/menu driven system in which part of the pull-down menu is transmitted to the hand-held unit for easy viewing and selections. This is particularly useful for collaborative work such as two persons comparing files or drawings on one PC display.

Since the hand-held unit has its own microprocessor, it can be used as a co-processor for the base unit. One of the major co-processing tasks could be the I/O processing such as voice and handwriting pre-processing. In speech recognition applications, it acts as a wireless microphone, audio digitizer, and compressor and the coded information of speech is sent to the base for further processing such as spectrum analysis and comparisons. In some cases, the recognition tasks can be split into two levels. The first level recognition which is for simple words such as numbers is done on the hand-held unit. The second level which is for general words and continuous speech is done on the base unit where high-power processor is commonly used. The search and comparison routines of the recognition software look at the database on the hand-held unit first and pass to the base unit via the wireless link if there is a miss. This two-level scheme can be applied to handwriting recognition also, for example, the hand-held unit can be made to recognize single alphanumerical characters and the base unit for complex handwriting scratches.

The useful range of a hand-held unit can be extended if a base unit which is connected to a cellular phone network or satellite phone/data network is installed in a car or truck. A user can still gain an access to the phone and data network while he is on the road. A side benefit of this arrangement is that the hand-held unit has much lower radio-frequency (RF) radiation than that of most cellular phones. This is because the hand-held unit described here is designed for short-range communications and hence has very low level of RF radiation.

Figure 1:
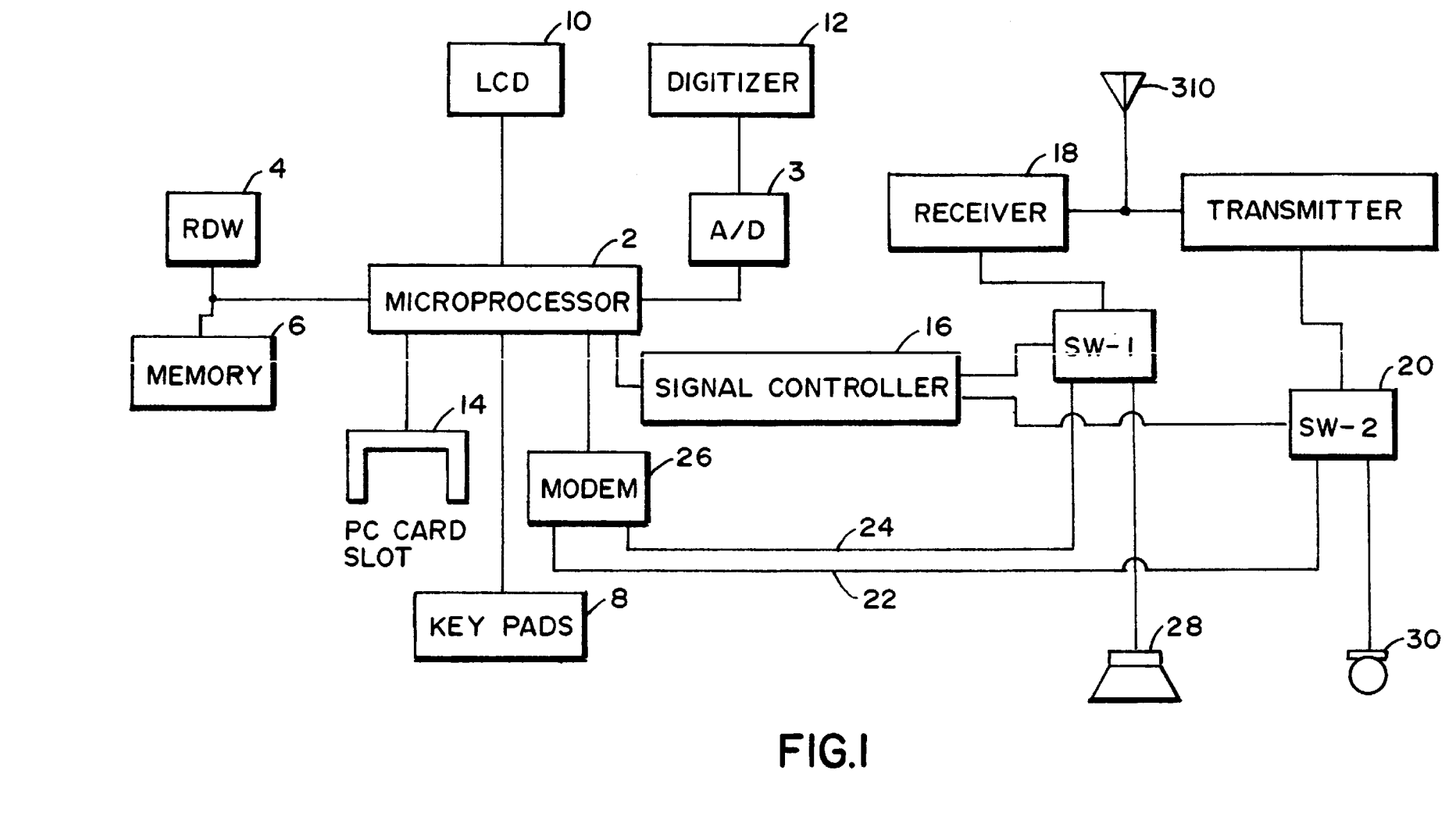
FIG. 1 shows a block diagram of a hand-held computer integrated with the handset of a cordless telephone according to the present invention by sending voice signals directly in analog form.
Figure 2:
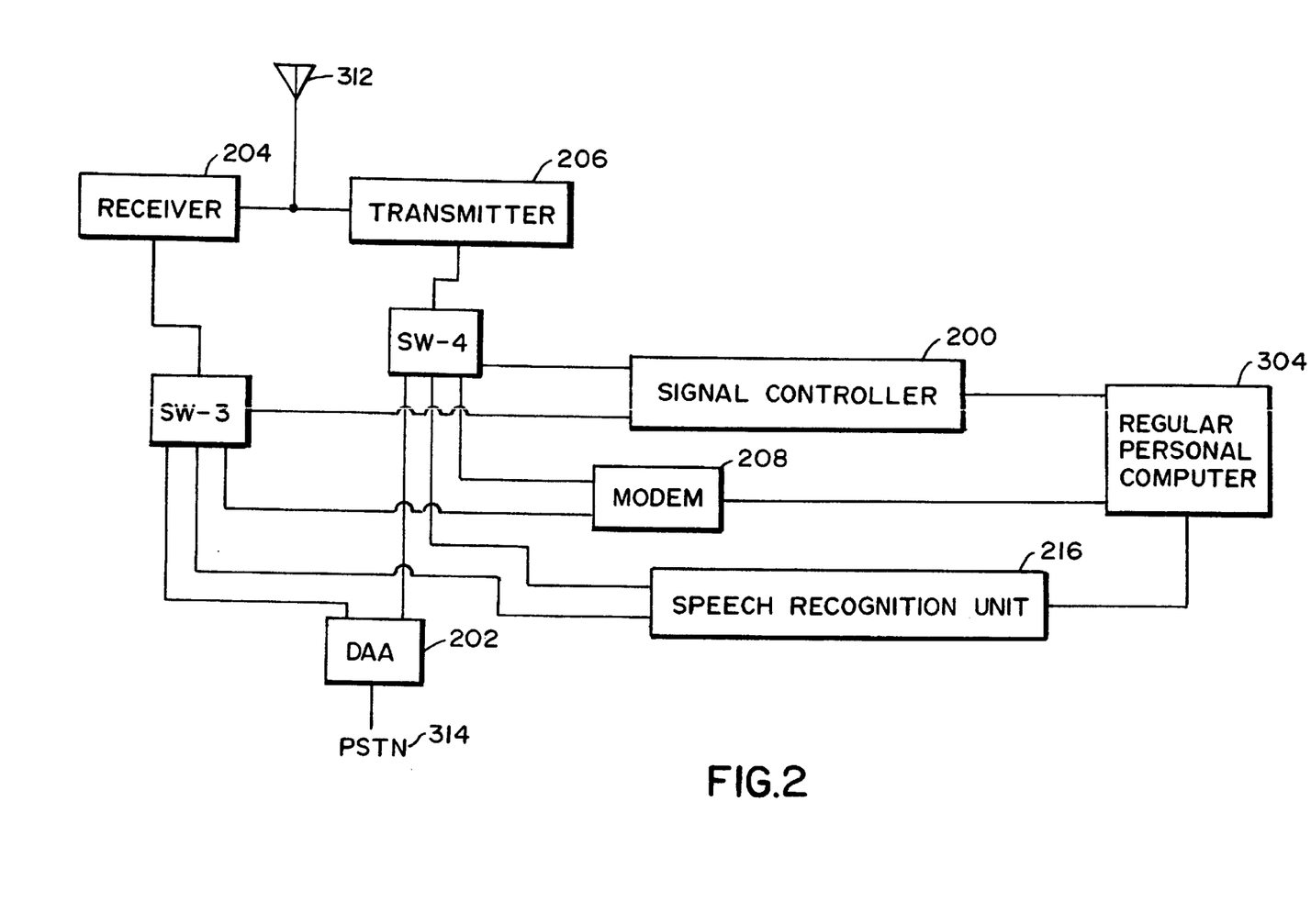
FIG. 2 shows a block diagram of a computer integrated with the base of a cordless telephone according to the present invention by sending voice signals directly in analog form.
Figure 6:
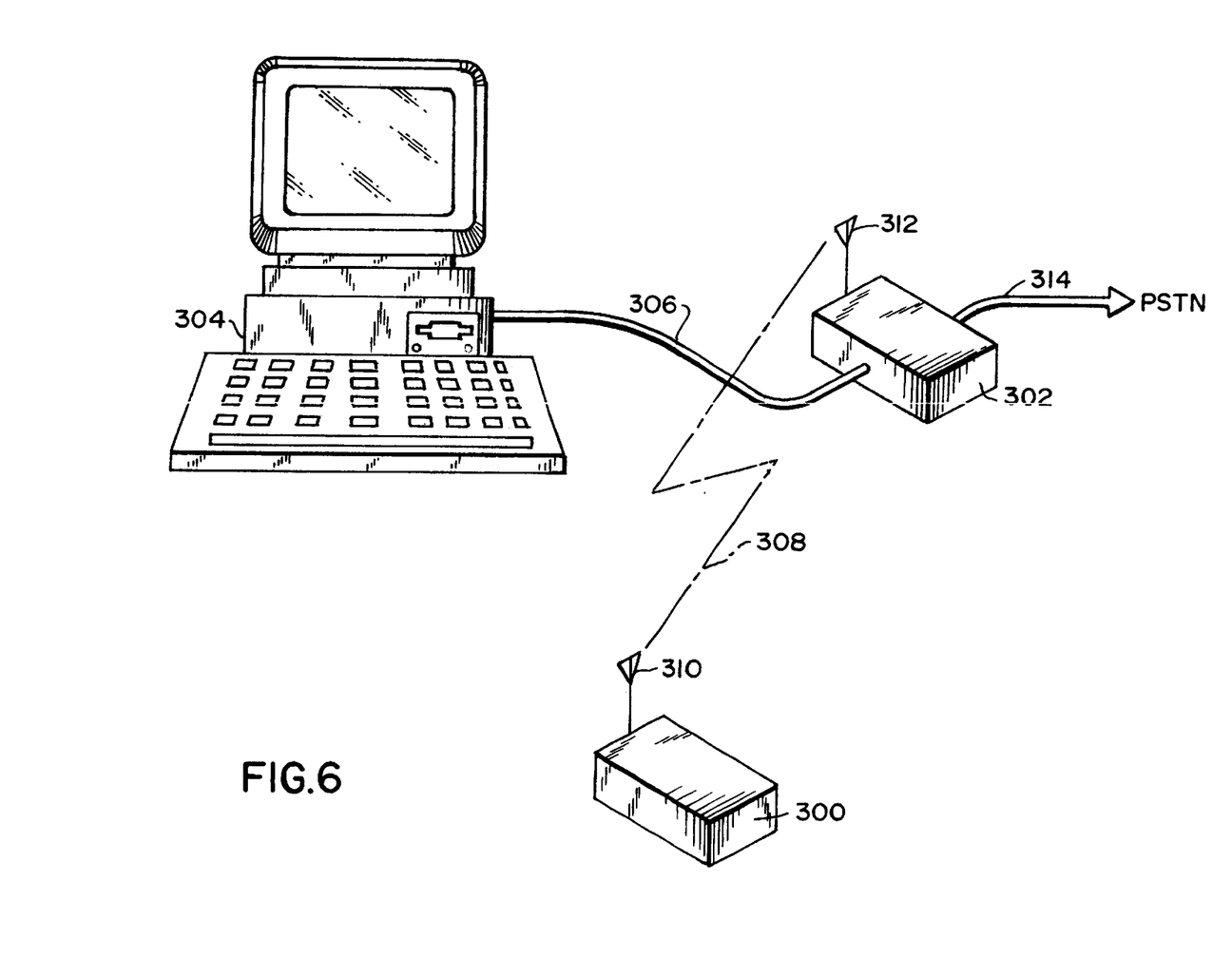
FIG. 6 shows a schematic diagram of the system according to the present invention.

Block diagrams of a computer system (shown in FIG. 6) integrated with a cordless telephone are shown in FIGS. 1 and 2. FIG. 1 is the block diagram of a hand-held computer which can be in the handset of a cordless telephone. The basic components of the hand-held unit (300 of FIG. 6) are microprocessors 2, read-only memory (ROM) 4, random-access memory (RAM) 6, keypads 8, a LCD display 10, and a digitizer 12. The digitizer 12 is transparent and overlaid on top of the LCD display. The digitizer 12 is connected to microprocessor 2 through analog-to-digital converter 3. For the convenience of illustration, only the basic components are shown in FIG. 1. However, it will be apparent to one of skill in the art how to construct the hand-held unit 300. Other circuits such as memory management, direct-memory access controller, input/output controller, bus interface, timer, clock and power management are not shown in FIG. 1. A personal computer card slot 14 is shown to demonstrate the expandability of the hand-held computer. A memory card can be plugged into slot 14 for expanding the system memory or an I/O card can be plugged into slot 14 such as a bar-code reader can be used to read bar codes. A signal traffic controller 16 is used to direct the telephone and data signal traffic under the command of the microprocessor 2. Microprocessor 2 does the encoding and decoding of the digital traffic signals between the handset 300 and the base station 302 of the cordless telephone 300 and controls the signal traffic through the two switches, SW-1 and SW-2. If data traffic is desired, the receiver 18 and transmitter 20 will be switched to connect to the receiver end 22 and transmitting end 24 of the modem 26, respectively. If voice traffic is needed, the receiver 18 and transmitter 20 will be switched to the loudspeaker 20 and microphone 30, respectively. The switches SW-1 and SW-2 can be controlled by commands keyed in from the key pads 8 or decoded from the signals transmitted from the base station 302. When the switches are connected to the modem 26, both the loudspeaker 28 and microphone 30 will be muted. The modem 24 used in the hand-held unit 300 is a public switched telephone network (PSTN), for example, compatible one such as the Hayes compatible modem or a dedicated modem for RF communication such as Gaussian Minimum Shift Keying (GMSK) modem shown in FIG. 3. The receiver 18 and transmitter 20 can be a narrow-band FM or a spread-spectrum type. The voice signal can be sent to modulate the carrier frequency directly or a subcarrier which is then modulating the carrier frequency.

FIG. 2 is the block diagram of the base station (which can be the base of a cordless telephone) 302 of a cordless telephone system according to the present invention integrated with a computer 304. The base station 302 can be a separate physical unit or a separate unit and connected to a computer 304 via a parallel, serial, or other input/out port 306. It can also be an add-on card to be plugged into the computer's common bus. The signal controller 200 in the base station 302 takes the command order from the computer 304 or from the signals 308 sent from the hand-held unit via antenna 310 which base station 302 receives by antenna 312 and flips the switches, SW-3 and SW-4. Controller 200 also generates and decodes the common PSTN 314 dual tone multi-frequency (DTMF) signals to and from the PSTN as well as the subscriber loop direct-current signals through the data access arrangement (DAA) 202 which is the interface device to the telephone line. If the computer 304 at the base station wants to send data to the handset, it tells the signal controller 200 to switch the receiver 204 and transmitter 206 to the modem 208 and wakes up the modem 26 at the hand-held unit 300. After handshaking and acknowledging, data will then be sent to the hand-held unit 300. The procedure will be reciprocated, if the hand-held unit 300 wants to send data to the base computer 304. If the hand-held unit wants to send data or voice to the outsiders via PSTN 314, then the receiver 204 and transmitter 206 will be connected to the DAA 202 directly. The in-coming calls from the PSTN 314 will be intercepted by the base station signal controller 200 and the base computer 304. Voice calls will be forwarded to the hand-held unit 300 if it is available or answered by the base computer 304 which emulates a telephone answering machine. Data calls will be received and stored in the base computer 304. Depending on the nature of the data, some of them will be connected to the base station. In this multi-line situation, the base computer can be used as a line controller also. The base station 302 can also be made to handle multiple handset units. The voice signals from the handset can be sent to the optional speech recognition unit 216 at base station for voice commands or dictation.

Figure 3:
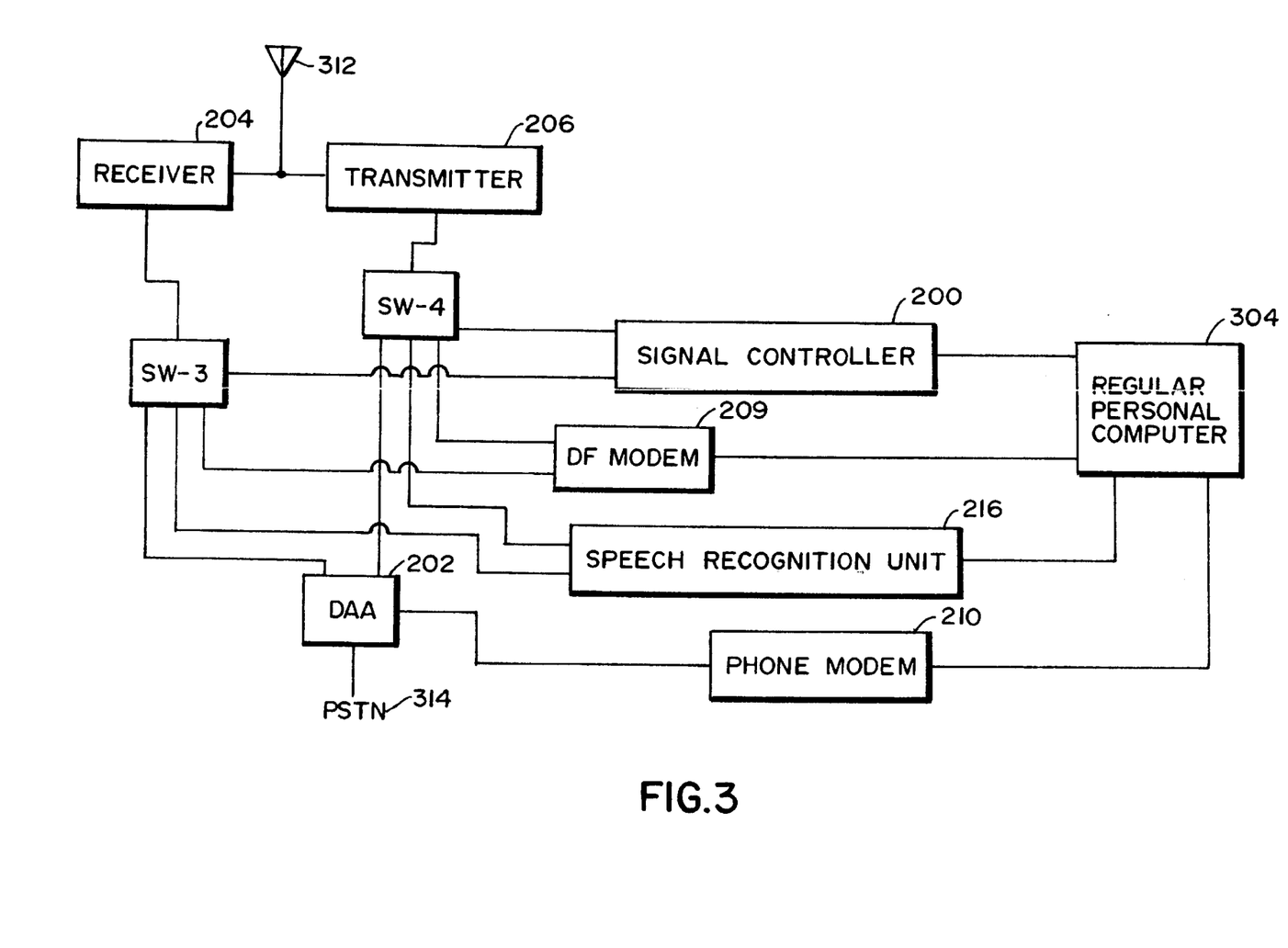
FIG. 3 shows a block diagram of a computer integrated with the base of a cordless telephone according to the present invention using a dedicated RF modem for data wireless link and a phone modem for a PSTN link.

FIG. 3 shows another embodiment of a computer integrated with the base of a cordless telephone using a dedicated modem for the wireless link and a telephone modem for the PSTN link. The voice signals are sent and received in analog format but the data on the wireless link are modulated and demodulated using a dedicated modem, for instance, a GMSK modem. The modulated data signals are first received by the receiver 204 and demodulated through the dedicated modem 209. The received data stream will be stored in the computer 304. Some actions will be performed on the received data such as error detection and corrections. The corrected data stream will be sent to its destination as directed. If the destination is a PSTN link, they will be sent to a phone modem 210 then the PSTN via the DAA 202.

Figure 4:
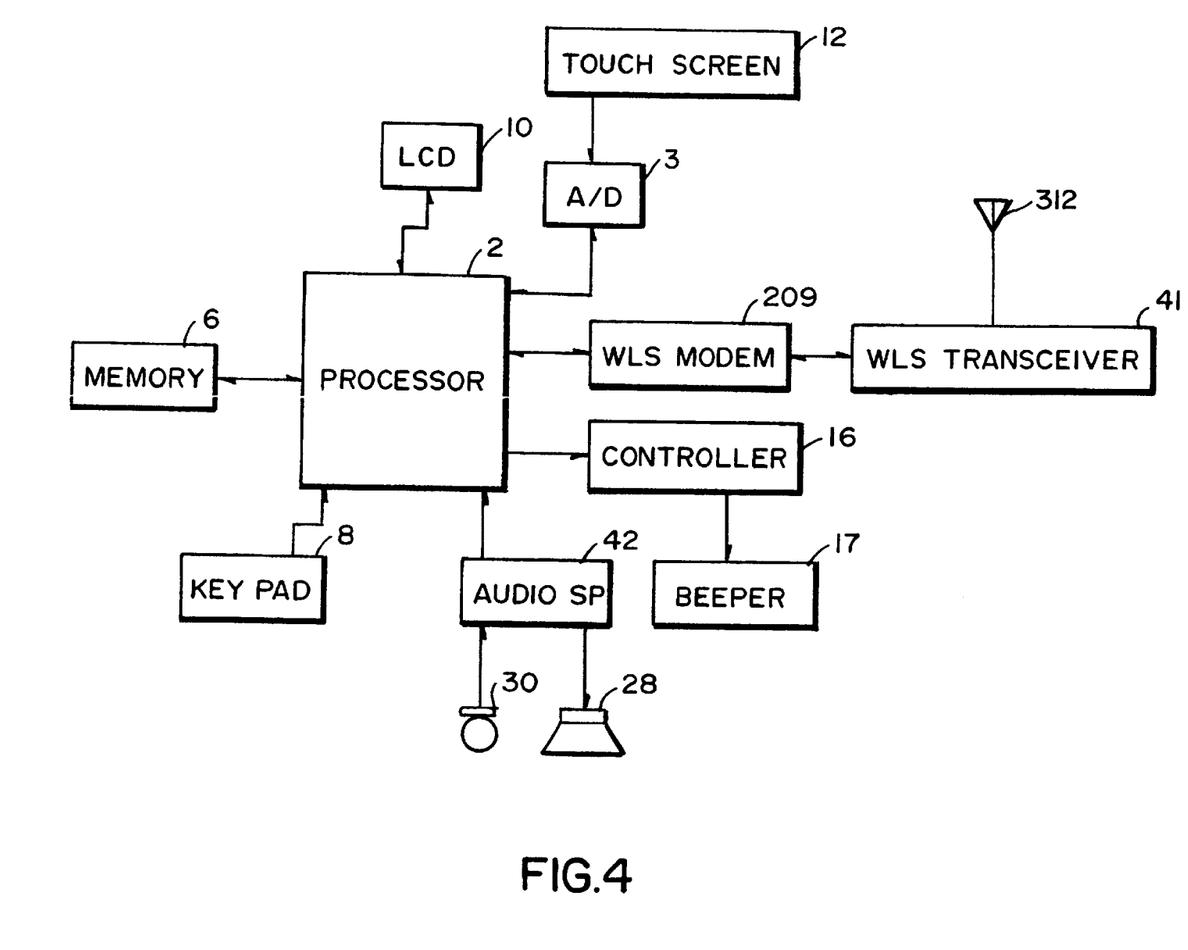
FIG. 4 shows a block diagram of a hand-held computer integrated with the handset of a cordless telephone according to the present invention by sending and receiving voice signals in digital format on the wireless link.
Figure 5:
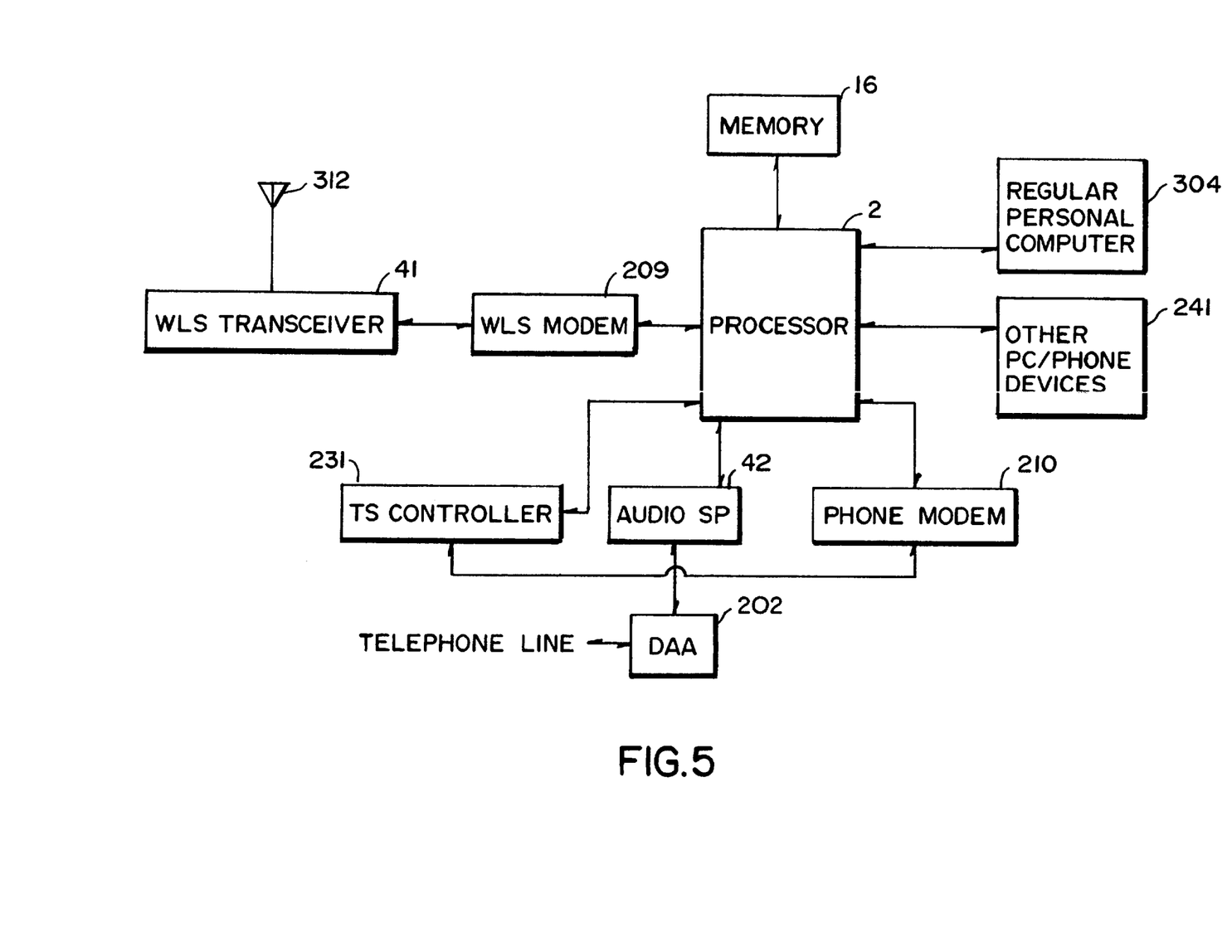
FIG. 5 shows a block diagram of a computer integrated with the base of a cordless telephone according to the present invention by sending and receiving voice signals in digital format on the wireless link.

FIGS. 4 and 5 are another embodiment of the present invention in which the voice signal is first digitized and sent through the wireless link in digital format. Referring to FIG. 4, voice signal picking up from the microphone 30 is first digitized and encoded by the audio signal processor 42 and then stored in the memory 6 through the processor 2. The digitized voice signal will be subjected to further processing such as adding codes for error detection and correction and wireless communications links. The ready-to-send signal is then fed to a wireless modem 209, the wireless transceiver 41, and antenna 312, in sequence. In the base station, see FIG. 5, the wireless signal is received by the antenna 312 and wireless transceiver 41. After demodulating from the wireless modem 209, the received raw digital data stream is then stored in memory 16 via the processor 2. The data will be decoded and corrected if errors are found in the wireless transmission. The processor 2 will identify the nature and destination of the data which is encoded in the data stream when it is sent from the handset. If it is a digitized voice signal and intended to go to a PSTN link, then a control signal will be sent to the telephone signal controller 231 which in turn will connect the audio signal processor 42 to the data access arrangement 202. The voice part of the data will be sent to the audio signal processor 42 thereafter. If the data is not a digitized voice and intended to go to the PSTN link, then the telephone signal controller 231 will connect the phone modem 210 to the DAA 202 and the data is passed to the phone modem 210 by the processor 2. If the data is intended for something else, it will be directed to other PC/phone devices 241 or another personal computer 304. The data traffic coming from the base station will follow similar route described here but in opposite direction.

Figure 7:
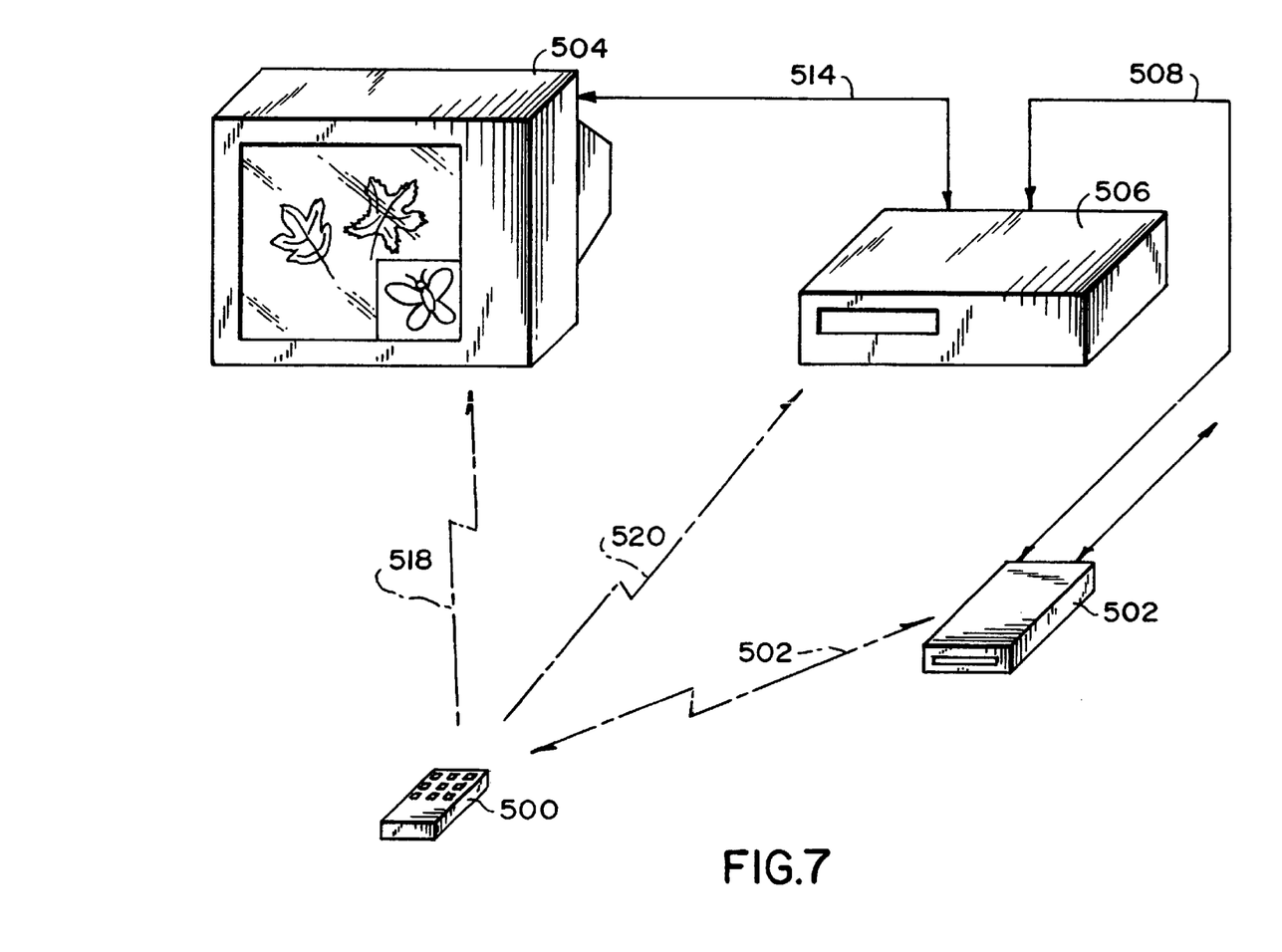
FIG. 7 shows a schematic diagram of a system according to the present invention adopted for use with a television and a VCR.

FIG. 7 shows another embodiment of a system of the present invention adopted for use in home applications. In addition to the implementation shown in FIG. 1, an universal IR module is added to the hand-held unit 500. The base station 502 can be a stand-alone unit or an adaptor plugged in a PC or a set-top box and has connection to external networks, such as PSTN, cable, and on-line services. By combining the universal IR module and cordless RF module into one unit, the hand-held unit 500 can use not only IR to control a TV 504, a VCR 506, and other appliances, but also RF for cordless telephone and remote access to external network and computation and storage resources in base station 502. An exemplary list of applications include interactive TV, home shopping, video games, household assistance, and on-line services for education, and entertainment by using remote speech and handwriting recognition, and simultaneous data-voice communication.

Figure 8:
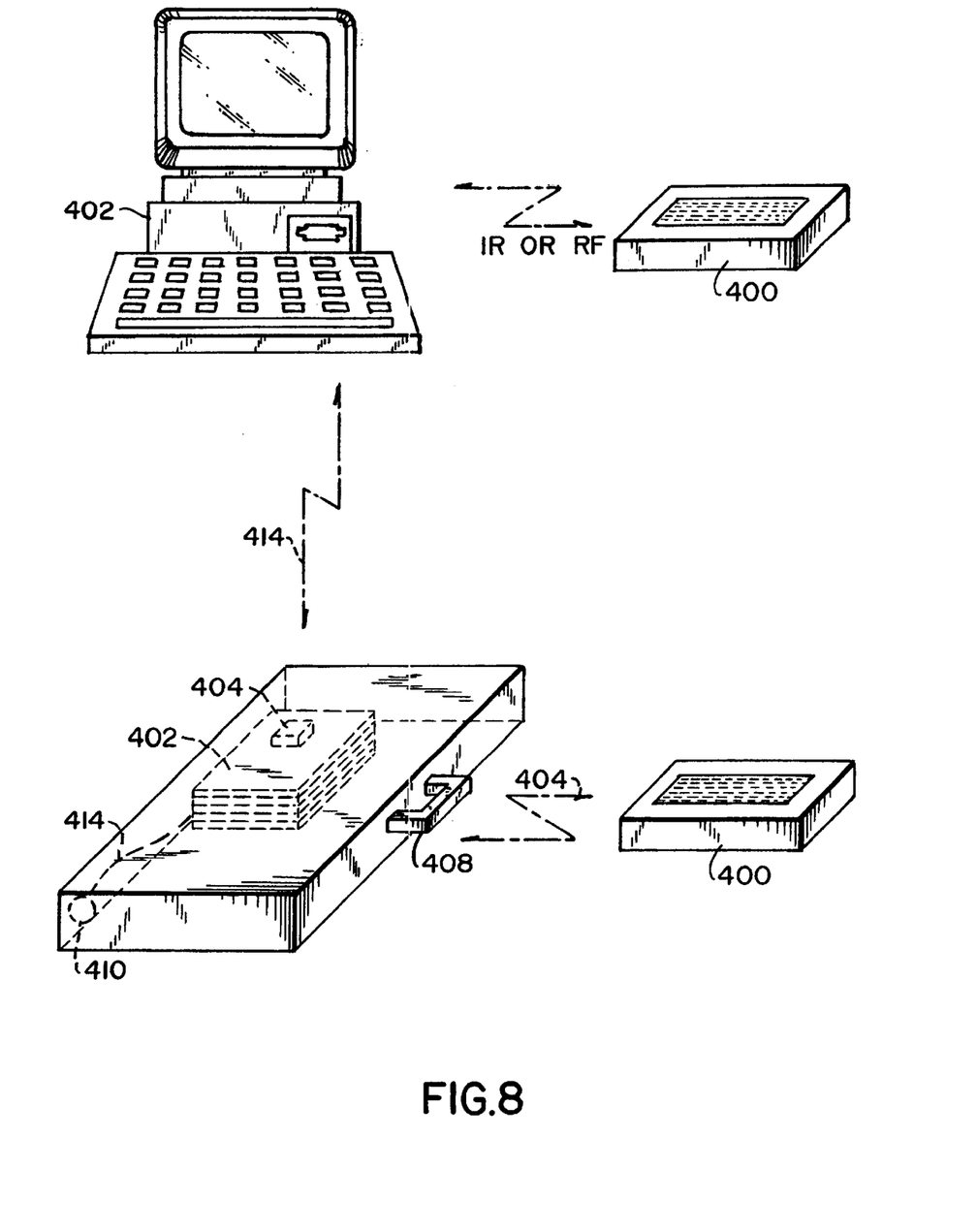
FIG. 8 shows a schematic diagram of the system according to the present invention adopted for use with a carrying case.

FIG. 8 illustrates another system configuration using present invention for mobile applications. It includes a hand-held unit 400, a base station and cellular phone 404 are integrated into a portable computer 402. Hand-held unit 400 relays all the computation-intensive tasks, such as speech and handwriting recognition, to portable computer 402 that executes those tasks and sends the results back to hand-held unit 400 through a RF or IR cordless link. One important application model shows cellular telephone 404, portable computer 402 are in a carrying case. A user uses the low-power IR or RF link to access the cellular telephone 404 through the base station in portable computer 402. The advantage is that the user only exposes to low-RF power (between 1 to 10 mW) instead of high-RF power of cellular telephone 404. In light of the recent health concerns caused by the transmit power of cellular telephone 404, this application provides a unique, safe solution for a user.

While the present invention has been described with respect to preferred embodiments, numerous modifications, changes, and improvements will occur to those skilled in the art without departing from the spirit and scope of the invention.

What is claimed is:

1. An apparatus offering a high degree of functionality comprising:
    a first hand held computer; said hand-held computer comprising:
        a microprocessor;
        a display coupled to said microprocessor;
        storage coupled to said microprocessor;
        a key pad coupled to said microprocessor;
        a modem coupled to said microprocessor;
        a digitizer coupled to said microprocessor;
        a signal controller coupled to said microprocessor;
        a first switch coupled to said signal controller;
        a second switch coupled to said signal controller;
        said modem coupled to said first switch and said second switch;
        a speaker coupled to said first switch;
        a microphone coupled to said second switch;
        an antenna;
        a receiver coupled to said first switch and said antenna; and a transmitter coupled to said antenna and said second switch;

a second main computer having a television associated therewith, said television having a monitor with a screen;

a base station; said base station comprising:
   a receiver;
   a transmitter;
   an antenna;
   a signal controller;
   a second modem;
   a speech recognition unit;
   a third switch;
   a fourth switch;
   a data access arrangement;
   said second modem is coupled to said third switch and said fourth switch;
   said signal controller is coupled to said third switch and said fourth switch;
   said receiver is coupled to said third switch, and said transmitter is coupled to said fourth switch and to said antenna;
   said base station being adapted for wireless communication to said first hand held computer and a direct electrical connection to said second computer;
   said base station has means for communication on a telephone line;
   said first hand-held computer has wireless means for communication with said base station; and
   said second main computer has means for direct electrical communication with said base station;
   said first hand held computer being in the proximity of said television so that signals transmitted by said first hand held computer can be received by said base station and processed by said second main computer and as a result appear on said screen on said monitor of said television.

2. An apparatus according to claim 1, wherein said first means is a wireless means.

3. An apparatus according to claim 1, wherein said first means is a direct electrical connection.

4. An apparatus according to claim 1, wherein said second computer coupled to said signal controller and said modem.

5. An apparatus according to claim 1, further including a speech recognition unit coupled to said first switch, said second switch and said second computer.

6. An apparatus according to claim 1 wherein said base station is contained within a portable container.

7. An apparatus according to claim 6, wherein said portable container is a carrying case.

8. An apparatus according to claim 1, wherein said first computer includes a television screen.

9. An apparatus according to claim 8 further including a VCR coupled to said television screen.

10. An apparatus according to claim 8, further including a VCR coupled to said television.

11. An apparatus offering a high degree of functionality compising:
   a digital assistant;
   said digital assistant comprising:
      a microprocessor;
      a display coupled to said microprocessor;
      storage coupled to said microprocessor;
      a key pad coupled to said microprocessor;
      a modem coupled to said microprocessor;
      a digitizer coupled to said microprocessor
      a signal controller coupled to said microprocessor;
      a first switch coupled to said signal controller;
      a second switch coupled to said signal controller;
   a base station;
   said base station comprising:
      a receiver;
      a transmitter;
      an antenna;
      a signal controller;
      a second modem;
      a speech recognition unit;
      a third switch;
      a fourth switch;
      a data access arrangement;
   a VCR;
   a television having a monitor with a screen;
   said pocketable digital assistant is wirelessly coupled to at least one of said television, said VCR and said base station;
   said base station is coupled to said VCR;
   said VCR is coupled to said television.

* * * * *